United States Patent Office 3,034,854  
Patented May 15, 1962

3,034,854  
SEPARATION OF CALIFORNIUM FROM CURIUM BY SOLVENT EXTRACTION  
Donald F. Peppard, Oak Park, and George W. Mason, Clarendon Hills, Ill., assignors to the United States of America as represented by the United States Atomic Energy Commission  
No Drawing. Filed July 20, 1960, Ser. No. 44,235  
2 Claims. (Cl. 23—14.5)

This invention deals with a process for the separation of californium values from curium values contained in aqueous solutions by solvent extraction.

When $Pu^{239}$ is bombarded with neutrons, a number of $n,\gamma$ reactions take place which, among others, lead to various curium and californium isotopes. The californium isotopes 252 and 254 are spontaneously fissionable and have relatively short half-lives for spontaneous fission. Therefore $Cf^{252}$ and $Cf^{254}$ are useful as neutron sources. The process of producing curium and californium by neutron bombardment of $Pu^{239}$ and various uses for both curium and californium are described in detail in U.S. Patent No. 2,859,095, granted to Winston M. Manning, Martin H. Studier, Herbert Diamond and Paul R. Fields on November 4, 1958.

It is desirable to isolate the californium from the other materials produced during the neutron bombardment of $Pu^{239}$, and in particular to separate the californium from the curium, because the curium is usually subjected again to neutron bombardment for further production of californium. It was found rather difficult, though, to separate these two elements from each other, probably because both are present in the aqueous solution in the same valence, namely in the trivalent state, and both have very similar chemical properties.

It is an object of this invention to provide a process of recovering californium values from an aqueous solution containing said values together with curium values in a high yield and at the same time in a high degree of purity.

It is another object of this invention to recover curium values from an aqueous solution containing said values together with californium values in a form that is suitable for bombardment with neutrons.

Normally substantially water-immiscible phospheric acid esters are suitable for the separation of tetravalent actinides from trivalent actinides; the tetravalent actinides are extracted into the phosphoric acid ester while the trivalent ions are taken up by the aqueous solution. Such a process is briefly described in the above-mentioned U.S. Patent No. 2,859,095.

It has been found that trivalent actinides can also be separated from each other with substantially water-immiscible acid esters of phosphoric acid and also with certain half-esters of organo-phosphonic acids as extractants and that, in particular, these substances bring about a separation of californium values from curium values by a preferred extraction of the californium values. The separation process of this invention is based on these findings.

The process of this invention thus comprises preparing an aqueous mineral acid solution of the californium-curium mixture, contacting the acid solution obtained with an organic solution of a substantially water-immiscible acid ester of phosphoric acid or of a half-ester of organo-phosphonic acid whereby said californium values are preferentially taken up by the organic solution while said curium values remain preferentially in the aqueous solution, and separating an aqueous raffinate phase from an organic extract phase.

Either acidic esters of orthophosphoric acid, $$[(HO)(HO)PO(OH)]$$

wherein one or two of the hydroxy groups are substituted by alkyl, aryl or mixed alkyl-aryl radicals or substituted variants of these radicals, can be used for the extraction process of this invention, or else half-esters of organo-phosphonic acids are suitable, which are phosphoric acids in which the hydrogen atom only of one hydroxy group is replaced by an organic group G′ and another hydroxy group has been replaced totally by an organic radical or group G, the third hydroxy group remaining unchanged. Thus the formula for the acidic esters would be $(RO)_2PO(OH)$ or $(RO)PO(OH)_2$, where R indicates the alkyl, aryl or alkyl-aryl radical, including substituted variants, and the formula for the half-esters of the organo-phosphonic acid would be $(G'O)(G)(PO)(OH)$. The radicals R, G and G′ should have at least four carbon atoms each to obtain a compound that has a sufficiently high water immiscibility necessary for solvent extraction processes. The radical found best for G′ is 2-ethyl hexyl and those preferred for G are 2-ethyl hexyl, monochloromethyl (hereinafter simply referred to as chloromethyl) and phenyl. Optimum results were obtained with the 2-ethyl hexyl hydrogen phenyl phosphonate.

Generally, the acid phosphonates were found to be superior to the acidic esters of the orthophosphoric acid if the comparison is made with esters that have the same organic radicals. At otherwise identical conditions 2-ethyl hexyl hydrogen phenyl phosphonate was superior to bis(2-ethyl hexyl) phosphoric acid by a factor of 100 as to the distribution ratios or extraction coefficients K (K is concentration of an extracted element in the organic phase obtained to the concentration of the same element left in the aqueous phase obtained).

The radiation of the actinides in the solutions obtained from neutron-bombarded $Pu^{239}$ has a decomposing effect on the solvents intended for the process of this invention and in particular causes hydrolysis of these esters. This is a drawback, because the hydrolysis products have a comparatively high affinity for curium and consequently extract curium to an undesirably high degree whereby, of course, the californium-curium separation is impaired. However, in the case of the phosphonic acids in which chloromethyl or phenyl are used as the G-radical, the hydrolysis products are water-soluble and thus are automatically removed from the solvent during extraction so that any curium temporarily extracted by the hydrolysis products is transferred back into the aqueous phase. This, however, is not the case for the phosphonic acid in which the G-radical is 2-ethyl hexyl and for acid phosphoric esters, and the hydrolysis product then has to be removed in a separate step or else, and this is the preferred way, by adding to the extractant a small quantity of trialkyl phosphate, e.g. tris(2-ethyl hexyl) phosphate in a concentration of from 5 to 40 percent by weight. This is another reason for preferring the phosphonic acids that are phenyl- or chloromethyl-substituted to that having 2-ethyl hexyl for G.

The neutron-bombarded plutonium material, to carry out the process of this invention, is first dissolved in mineral acid, such as nitric acid, hydrochloric acid, perchloric acid and sulfuric acid. If, after the separation of curium and californium by this invention, further processing by ion exchange is intended, hydrochloric acid is the preferred mineral acid. The concentrations of californium and curium can range up to 10 grams per liter as far as extraction by the solvents of this invention is concerned; however, in order sufficiently to protect personnel from radiation hazards without the necessity of too elaborate shielding equipment, it is advisable to restrict the concentrations to lower values.

Both californium and curium are extracted to a certain degree by the solvents of this invention, and the extractability of both changes about parallelly with the same changes of the operating conditions. The variables must be adjusted so that the fraction of californium reporting in the organic phase is greater than 50 percent per one equilibration step and that of curium less than 50 percent. If the separation brought about by one extraction operation is not sufficiently high, a repetition will yield improved results.

In the following the conditions are discussed that are optimal or often critical for the process of this invention. The acidity of the aqueous solution containing the curium and californium values should be at least 0.01 M in order to facilitate phase separation. The upper limit for the acid concentration is 1 M for 2-ethyl hexyl hydrogen phenyl phosphonate and 2-ethyl hexyl hydrogen chloromethyl phosphonate as the extractants, but it should be 0.1 M if 2-ethyl hexyl hydrogen 2-ethyl hexyl phosphonate is used; for bis(2-ethyl hexyl) phosphoric acid and bis-(octyl phenyl) phosphoric acid the upper limit for the acidity is 0.5 M.

The esters intended for the extraction process of this invention have a relatively high viscosity and are therefore used in diluted form so that phase separation is faster and easier. Carbon tetrachloride and aromatic water-immiscible hydrocarbons are suitable for this purpose; most aliphatic hydrocarbons have the tendency to form a third layer or phase and therefore are not too well suited. Examples of the many satisfactory hydrocarbon diluents are toluene, benzene and xylene, toluene being the preferred one, because it has a relatively high vaporization point and is not a mixture of different isomers.

The concentration of the extractant in the diluent may vary widely; it preferably is between 0.001 and 1.5 $\underline{F}$ for 2-ethyl hexyl hydrogen phenyl phosphonate and 2-ethyl hexyl hydrogen chloromethyl phosphonate and from 0.01 to 1.5 $\underline{F}$ for 2-ethyl hexyl hydrogen 2-ethyl hexyl phosphonate. ("$\underline{F}$" is a symbol to indicate formality, which means that one liter contains as many grams of the extractant as the formula indicates, disregarding any polymerization or dissociation that may take place.)

The volume ratio of aqueous solution and organic extractant solution can range widely; ratios between 20:1 and 1:20 have been found suitable.

Room temperature, approximately 25° C., is the preferred temperature for extraction. The two phases are usually thoroughly contacted either by stirring or shaking in a batch operation or by countercurrent flow in a column or other continuous operation. After this, the phases are allowed to settle for a few minutes and are then separated from each other by means known to those skilled in the art. The californium extracted into the solvent phase is back-extracted with an aqueous medium, for instance with mineral acid of a concentration of from 1 to 6 M, depending on the nature and concentration of the extractant in the diluent, the more concentrated acid being required for the stronger extractants and the higher concentrations thereof. By this the solvent is simultaneously regenerated for reuse.

Below a few examples will be given to illustrate the operativeness of the process of this invention. For the purpose of the runs carried out in these experiments, a synthetic solution was mostly prepared from a solution containing a mixture of californium isotopes on one hand and a solution containing $Cm^{244}$ on the other hand. $Cm^{244}$ is an $\alpha$-emitter (half-life 18 years), and its amount can be easily determined by $\alpha$-counting; the californium solutions, among others, contained the 70-day $Cf^{254}$ which is spontaneously fissionable; thus, the results of fission-counting were considered indicative of the total californium content.

All solvent solutions and aqueous solutions were equilibrated prior to contacting with acid solvents and aqueous solutions, respectively, that contained no metals but had about the same acidity and salt contents as the californium- and curium-containing solutions, so that acid and salt concentrations, etc. were not changed by transfer into the other phase.

In order to reduce hydrolysis and polymerization of the solvents under the effect of radioactivity, the contact times were held to about three minutes. The extracted amounts of californium and curium extracted into the organic solvent were then back-extracted, as mentioned before, with dilute mineral acid of a concentration between 1 and 6 M, and the stripped metal values were once more extracted into an organic solvent, usually of the same type as that used in the first extraction step.

For analytical purposes, aliquots of the final organic phases were evaporated on a platinum disk and $\alpha$-counted for their curium content and fission-counted for their californium content. Alpha-counting can be carried out in the presence of $\beta$- and $\gamma$-emitting fission products. However, in order to obtain a salt-free aqueous solution for counting, for instance a solution that is free from sodium chloride, sodium nitrate and the like, the aqueous raffinate phase was usually extracted with an about equal portion of a 2 percent solution of isooctyl pyrophosphate in toluene that had been preequilibrated with an aqueous curium-free solution of otherwise the same composition as the aqueous raffinate phase. Usually 1 ml. of the aqueous solution remaining after the first extraction step was contacted with 1 ml. of the solution of octyl pyrophosphate. The pyrophosphate solution, which then was free of all extraneous salts, was then evaporated on a platinum disk and $\alpha$- and fission-counted.

In the following a few examples are given for illustrative purposes.

EXAMPLE I

A feed solution was made up that was 0.125 $\underline{F}$ in hydrochloric acid and contained $1.2 \times 10^4$ fission counts per minute per milliliter (californium), in the table given below referred to as f.-c./m., and $8.0 \times 10^6$ alpha counts per minute per milliliter (curium), which will be designated in the table below as $\alpha$-c./m. The extractant used was a 0.05 $\underline{F}$ solution of 2-ethyl hexyl hydrogen phenyl phosphonate in toluene. One-ml. portions each of extractant and feed solution were centrifuged in a 15-ml. polyethylene tube for two minutes. The lighter organic phase and the heavier aqueous phase were separated from each other, and each phase was placed in a 15-ml. capped polyethylene centrifuge tube.

The organic phase was then scrubbed twice, each time with a 1-ml. portion of 0.125 $\underline{F}$ aqueous hydrochloric acid for two minutes. The organic phase so treated is the "final organic phase."

The aqueous raffinate phase was also scrubbed twice, each time with 1 ml. of the 0.05 $\underline{F}$ solution of 2-ethyl hexyl hydrogen phenyl phosphonate in toluene. The scrubbed aqueous phase is the "final aqueous phase."

For analysis, 0.100-ml. aliquots of both aqueous and organic final phases were evaporated, each on a platinum disk, and each evaporated sample was then fission- and $\alpha$-counted. From the data thus obtained the total contents of final aqueous and organic phases were calculated. The results are compiled in Table I.

Table I

| Phase | Cf f.-c./m. per ml. | Cm α-c./m. per ml. | Cf/Cm by activity, f.-c./m. / α-c./m. | D.F.[1] Cf/Cm | D.F.[1] Cm/Cf |
|---|---|---|---|---|---|
| Feed | $1.2 \times 10^4$ | $8.0 \times 10^6$ | $1.5 \times 10^{-3}$ | | |
| Final Organic Phase | $7.1 \times 10^3$ | $2.9 \times 10^2$ | $2.4 \times 10$ | $1.6 \times 10^4$ | |
| Final Aqueous Phase | $2.4 \times 10^2$ | $7.2 \times 10^6$ | $3.3 \times 10^{-5}$ | | $4.5 \times 10$ |

[1] The decontamination factor for californium from curium is the ratio of californium:curium in the final organic phase to the corresponding ratio in the feed solution, while the decontamination factor of curium from californium is the ratio of curium:californium in the final aqueous phase to that in the feed solution.

EXAMPLE II

A feed solution was used containing californium and curium in an amount yielding $6 \times 10^7$ f.-c./m. and $2 \times 10^7$ α-c./m., respectively; it had a hydrochloric acid concentration of 0.25 $\underline{F}$. The extractant was a toluene solution 0.75 $\underline{F}$ in bis(2-ethyl hexyl) phosphoric acid and 0.22 $\underline{F}$ in tris(2-ethyl hexyl) phosphate. The scrub solution had the same composition as the feed solution except that it was free from californium and curium. The volume of organic:aqueous liquids for each extraction step was two. One ml. each of feed solution and scrub solution was used for each contact.

In carrying out the experiment, four 2-ml. portions of extractant were contacted, in series, with a 1-ml. portion of feed solution and then successively, also in series, with five 1-ml. portions of scrub solution. In each extraction step the distribution ratio found for californium was 4.0 and that found for curium 0.085. In Table II the decontamination factors (D.F.) of the various extraction and scrubbing steps are summarized. In this table, the aqueous and organic product solutions are numbered consecutively, the number-1 aqueous solution being the feed leaving the fourth portion of organic extractant and the number-1 organic solution being the first organic portion after contact with feed and scrubbing solutions.

Table II

| Phase and Product | Extraction Step | Yield (Percent) | D.F. |
|---|---|---|---|
| Cf in Organic Phase | 1 | 51 | $>2 \times 10^4$ |
| | 2 | 34 | $>2 \times 10^3$ |
| | 3 | 11 | $\sim 6 \times 10^2$ |
| | 4 | 2 | $\sim 1 \times 10^2$ |
| | [1]1 | 55 | $1 \times 10^2$ |
| Cm in Aqueous Phase | [1]2 | 30 | $6 \times 10^2$ |
| | [1]3 | 9 | $1 \times 10^2$ |
| | [1]4 | 4 | 7 |
| | [1]5 | 1 | 4 |
| | [1]6 | 1 | 0.3 |

[1] Scrubbing step.

It was also found that californium can be separated from yttrium values associated with it in aqueous solutions by the process of this invention if the mineral acid concentration of the feed is adjusted so that a separation factor beta of above unity is obtained. (The separation factor is the distribution ratio, organic:aqueous, of yttrium divided by that of californium.) In this case, the yttrium is preferentially extracted, and the californium preferentially remains in the aqueous raffinate. This is described in the following example.

EXAMPLE III

The procedure was the same as that of Example II except that 3-ml. portions of organic extractant solution and only three scrubbing steps were used.

One ml. of a feed solution containing $2 \times 10^5$ f.-c./m. of californium and $2 \times 10^7$ β-c./m. of $Y^{91}$ was passed through four portions of extractant, a 1.0 $\underline{F}$ solution of hydrogen diphenyl phosphate in toluene. The system contained hydrochloric acid in a concentration of 12 $\underline{F}$. The scrubbing solution was an aqueous 12 $\underline{F}$ hydrochloric acid, and 1 ml. was used for each step. The distribution coefficient of californium always was 0.018 and that of yttrium 7, which amounts to a separation factor of 388. The californium contents of the final aqueous phase and the decontamination factors for each extraction-scrubbing cycle are listed in Table III, also there "scrubbing step 1" being the feed solution after it had passed through the four portions of extractant.

Table III

| Scrubbing Step | Yield Cf (Percent) | D.F. |
|---|---|---|
| 1 | 78 | $>10^3$ |
| 2 | 17 | $>10^3$ |
| 3 | 4 | $5 \times 10^2$ |
| 4 | $\sim 1$ | $\sim 10$ |

When a 0.4 $\underline{F}$ solution of hydrogen dicyclohexyl phosphate in toluene was used instead of bis(2-ethyl hexyl) phosphoric acid and a hydrochloric acid concentration of 0.25 $\underline{F}$ in feed and scrub, the distribution ratio of yttrium was 10.2 and that for californium 0.25; this amounts to a separation factor of 40 in contradistinction to that of 388 in the case of hydrogen diphenyl phosphate and 12 $\underline{F}$ hydrochloric acid. In another instance, when hydrogen dibutyl phosphate was used, the separation factor ranged from 12 to 25, again with yttrium being the better extractable element.

Another application of the extractants of the invention is the separation of trivalent berkelium from trivalent cerium contained in aqueous mineral acid solution. This is shown in Example IV.

EXAMPLE IV

An aqueous feed solution containing $2 \times 10^5$ β-c./m. of $Bk^{249}$ and $1 \times 10^5$ β-c./m. of $Ce^{144}$ plus daughter $Pr^{144}$ and being 0.13 $\underline{F}$ in hydrochloric acid was extracted with a 0.5 $\underline{F}$ solution of bis(2-ethyl hexyl) phosphoric acid by the same procedure used in Example III, except that four 2-ml. portions of extractant solutions were used; a 1-ml. fraction of feed solution and three 1-ml. portions of scrub solution were used. The extraction, as in all other examples, was carried out at room temperature. The berkelium contents of the final organic phases and the decontamination factors obtained are shown in Table IV, again final organic phase No. 1 being the first organic portion after contact with feed and three scrubbing solutions.

Table IV

| Extraction Step | Yield Bk (Percent) | D.F. |
|---|---|---|
| 1 | 50 | $2 \times 10^2$ |
| 2 | 35 | $\sim 30$ |
| 3 | $\sim 10$ | $>2$ |
| 4 | $\sim 5$ | |

When the separation was carried out with bis(octyl phenyl) phosphoric acid, the separation factor for Bk (III) from Ce (III) was usually below 5, but above unity.

It will be understood that this invention is not to be limited to the details given herein but that it may be modified within the scope of the appended claims.

What is claimed is:

1. A process of separating californium values from curium values present together in an aqueous hydrochloric acid solution in their trivalent state of oxidation, comprising adjusting the acidity of said aqueous solution to between 0.01 and 1 M, contacting said aqueous solution with an organic extractant, said extractant consisting of a solution of an acidic substantially water-immiscible ester selected from the group consisting of 2-ethyl hexyl hydrogen monochloromethyl phosphonate and 2-ethyl hexyl hydrogen phenyl phosphonate in toluene, the concentration of the phosphonate in said solution being between 0.001 and 1.5 $\underline{F}$, whereby said californium values are preferentially taken up by an organic extract phase while said curium values preferentially remain in an aqueous raffinate, and separating said organic phase from said aqueous raffinate.

2. The process of claim 1 wherein the californium values are back-extracted from the phosphonate solution by contact with mineral acid having a concentration between 1 and 6 M.

References Cited in the file of this patent

UNITED STATES PATENTS 2,859,095    Manning et al. _____ Nov. 4, 1958

OTHER REFERENCES

Brown et al.: Nuclear Science Abstracts, vol. 12, No. 1, Abstract No. 150 (Jan. 15, 1958).

Burger et al.: Journal of Physical Chemistry, vol. 62, pp. 590–593 (May 1958).

Peppard, Mason, and Sironen: Journal of Inorganic and Nuclear Chemistry, vol. 10, pages 117–127 (April 1959).

Peppard, Mason, Driscoll, and McCarty: Journal of Inorganic and Nuclear Chemistry, vol. 12, pp. 141–148 (December 1959).